(12) United States Patent
Yuan et al.

(10) Patent No.: US 12,199,563 B2
(45) Date of Patent: Jan. 14, 2025

(54) PHOTOVOLTAIC SHUTDOWN CIRCUIT AND PHOTOVOLTAIC SYSTEM

(71) Applicant: AOSIMI (Ningbo) Intelligent Photovoltaic Co., Ltd, Yuyao (CN)

(72) Inventors: Zhen Yuan, Yuyao (CN); Guojun Mei, Yuyao (CN); Jiancheng Wang, Yuyao (CN); Chao Lv, Yuyao (CN)

(73) Assignee: AOSIMI (NINGBO) INTELLIGENT PHOTOVOLTAIC CO., LTD, Yuyao (CN)

( * ) Notice: Subject to any disclaimer, the term of this patent is extended or adjusted under 35 U.S.C. 154(b) by 127 days.

(21) Appl. No.: 18/172,984

(22) Filed: Feb. 22, 2023

(65) Prior Publication Data

US 2024/0113657 A1    Apr. 4, 2024

(30) Foreign Application Priority Data

Sep. 30, 2022    (CN) ........................ 202211210993.6

(51) Int. Cl.
*H02S 40/36*    (2014.01)
*H02H 7/20*    (2006.01)

(52) U.S. Cl.
CPC ............... *H02S 40/36* (2014.12); *H02H 7/20* (2013.01)

(58) Field of Classification Search
CPC .................................. H02S 40/36; H02H 7/20
See application file for complete search history.

(56) References Cited

U.S. PATENT DOCUMENTS

| 2020/0303949 | A1 | 9/2020 | Pauletti et al. |
| 2020/0335976 | A1* | 10/2020 | Wei ........................ H02J 3/381 |
| 2021/0281065 | A1* | 9/2021 | Zhu ........................ H02S 40/32 |

FOREIGN PATENT DOCUMENTS

| JP | H10201105 A | 7/1998 |
| JP | 2000358330 A | 12/2000 |
| KR | 101794975 B1 | 11/2017 |
| WO | WO-2012014502 A1 | 2/2012 |

* cited by examiner

*Primary Examiner* — Tae-Sik Kang
(74) *Attorney, Agent, or Firm* — MUNCY, GEISSLER, OLDS & LOWE, P.C.

(57) ABSTRACT

Disclosed are a photovoltaic shutdown circuit and a photovoltaic system. The photovoltaic shutdown circuit comprises a shutdown power line, a signal receiving module, a signal processing module, and a controllable switch module. The signal processing module comprises a signal modulation unit and a threshold comparison unit. A switch end of the controllable switch module is connected in series to the shutdown power line. The signal receiving module is connected to the shutdown power line for receiving a first signal with a controlling signal; the signal modulation unit is for reverting the controlling signal; the threshold comparison unit is connected to the signal modulation unit to receive the reverted controlling signal and compare the reverted controlling signal with a set threshold to output a driving signal. The controllable switch module is connected to the threshold comparison unit to receive the driving signal and control an on/off of the controllable switch module.

10 Claims, 2 Drawing Sheets

PHOTOVOLTAIC SHUTDOWN CIRCUIT AND PHOTOVOLTAIC SYSTEM

CROSS-REFERENCES TO RELATED APPLICATIONS

The present disclosure claims the priority of Chinese patent application No. 202211210993.6, filed on Sep. 30, 2022, the entire contents of all of which are incorporated herein by reference.

TECHNICAL FIELD

The present disclosure relates to the technical field of photovoltaic system, in particular to a photovoltaic shutdown circuit and a photovoltaic system.

BACKGROUND

The global demand for clean renewable energy is increasing, and the photovoltaic generation has been developed rapidly especially after China proposes the carbon-control strategy. But the ensuing safety issues cannot be ignored, photovoltaic fires happen from time to time. Because the photovoltaic module series voltage up to thousands of volts leads to fire hazards, the United States took the lead in promulgating safety regulations of rooftop photovoltaic power plants in 2014, followed by Japan, Europe and other countries to promulgate and implement relevant regulations. Those regulations require the rooftop photovoltaic power plants to have a device that can quickly cut off the connection between photovoltaic module devices in abnormal conditions or in fire, so that the system voltage can be reduced to a safe voltage range. The device is called photovoltaic shutdown device, abbreviated as RSD.

At present, the mature technology program is mainly TI 9361, which is based on the PLC one-way communication of SUNSPEC protocol. In China PLC chip for photovoltaic DC (Direct Current) is in the developing and testing stage. Due to the high cost of TI's special chip resulted from capital requirement and order requirement, a variety of solutions have emerged in China, such as protocol-based PLC_SOC solution, protocol-based PLC_SOC+MCU solution, protocol-based MCU solution, and pure analog solution without protocol. The technical difficulty of the analog solution without protocol is the greatest, because without protocol it is impossible to directly shield the interference to PLC signals from the ripple of photovoltaic modules and inverters. For commercial photovoltaic rooftop power plants, the maximum recognition distance for PLC signal is 300 meters, while a communication performance exceeding 300 meters is required. The PLC signal is very weak when the distance exceeds 300 meters, therefore the component ripple on DC busbar, especially the ripple of inverters, will cause serious interference to the PLC signal.

SUMMARY

In view of the defects of the prior art, the present disclosure provides a photovoltaic shutdown circuit, to ensure that the photovoltaic shutdown circuit can correctly identify the controlling signals from the controlling signal generator which is more than 300 meters away from the photovoltaic shutdown circuit, and effectively avoid the influence of the interference signal on the control of the photovoltaic shutdown circuit, so that to guarantee stable and reliable operation of the photovoltaic shutdown circuit. The present disclosure further provides a photovoltaic system.

The technical solution of the present disclosure is as follows:

A photovoltaic shutdown circuit, which comprises a shutdown power line, a signal receiving module, a signal processing module, and a controllable switch module; the signal processing module comprises a signal modulation unit and a threshold comparison unit;

A switch end of the controllable switch module is connected in series to the shutdown power line to control an on/off of the shutdown power line;

The signal receiving module is connected to the shutdown power line for receiving a first signal with a controlling signal of the shutdown power line; and an output end of the signal receiving module is connected to the signal processing module for coupling the first signal into the signal modulation unit;

The signal modulation unit is configured to revert the controlling signal of the first signal; and an input end of the threshold comparison unit is connected to an output end of the signal modulation unit to receive the reverted controlling signal and compare the reverted controlling signal with a set threshold to output a driving signal;

The controllable switch module is connected to the threshold comparison unit to receive the driving signal and control an on/off of the controllable switch module according to the driving signal.

In use, the photovoltaic shutdown circuit is configured to connect a photovoltaic module and an inverter; a controlling signal generator is provided on a bus between the photovoltaic shutdown circuit and the inverter, and the controlling signal generator sends a controlling signal to the photovoltaic shutdown circuit through the bus.

When above structure is adopted, the controlling signal is output from the controlling signal generator to the photovoltaic shutdown circuit through the bus, then the controlling signal is output to the shutdown power line, and during the transmission of the controlling signal there will be interference from ripples generated by other electronic components. The signal receiving module is configured to receive the first signal in the shutdown power line, wherein the first signal comprises a controlling signal and an interference signal. The signal modulation unit receives the first signal and then reverts the controlling signal, the threshold comparison unit compares the controlling signal with a set threshold according to the reverted controlling signal to control the controllable switch module to realize an on/off between the photovoltaic module and the inverter.

The above structure can make the photovoltaic shutdown circuit correctly identify the controlling signal from a controlling signal generator which is more than 300 meters away from the photovoltaic shutdown circuit, and can effectively avoid the influence of the interference signal on the control of the photovoltaic shutdown circuit, which can guarantee the stable and reliable operation of the photovoltaic shutdown circuit.

Further, the shutdown power line comprises a shutdown positive pole line and a shutdown negative pole line, and the shutdown negative pole line is grounded. A switch end of the controllable switch module is connected in series to the shutdown negative pole line to control an on/off of the shutdown negative pole line; the signal processing module is provided between the shutdown positive pole line and the shutdown negative pole line.

Further, the signal processing module comprises an amplification unit configured to amplify signals, and the output end of the signal modulation unit is connected to the threshold comparison unit through the amplification unit.

By adopting aforementioned structure, a controlling signal reverted by the signal modulation unit is amplified by the amplification unit and output to the threshold comparison unit, which enables the threshold comparison unit to better identify the reverted controlling signal.

Further, the signal processing module comprises a time delay unit configured to delay signals, and the threshold comparison unit is connected to the controllable switch module through the time delay unit.

By adopting aforementioned structure, the time delay unit can delay a driving signal output from the threshold comparison unit to shield a pulse interference signal during a cycle, and at the same time can accelerate a function of shutting off the controllable switch module to prevent frequent switching of the controllable switch module caused by weakening of the photovoltaic module in early morning and at night, or to prevent the occurrence of serious heating of the controllable switch module caused by starting fast shutdown function under high current or instant short circuit, and to prevent the occurrence of breakthrough damage.

The time delay unit provides an input signal 20 milliseconds to 500 milliseconds delay.

Further, the aforementioned photovoltaic shutdown circuit comprises a linear power module, an input end of the linear power module is connected to the shutdown power line, and an output end of the linear power module is connected to the signal processing module and/or the controllable switch module to supply power thereto. The input end of the linear power module is connected to the shutdown positive pole line.

By adopting above structure, the stability of the operation of the photovoltaic shutdown circuit is guaranteed.

Further, the input end of the linear power module is connected to the shutdown positive pole line through a first resistor.

By adopting above structure, the first resistor is able to absorb the controlling signal with damping; a resistance value of the first resistor is in a range of 2.2Ω to 499Ω.

Further, the signal receiving module comprises a first capacitor, a second capacitor, and a first inductor. One end of the first capacitor is connected to the shutdown negative pole line and another end of the first capacitor is connected to one end of the first inductor, another end of the first inductor is connected to one end of the second capacitor, another end of the second capacitor is connected to the shutdown positive pole line, the end of the first capacitor connected to the first inductor is grounded, and the end of the second capacitor connected to the first inductor is formed to be the output end of the signal receiving module.

By adopting above structure, the first signal in the shutdown power line is coupled into the signal modulation unit after a coupling of the first capacitor and a resonant frequency selection by the first inductor and the second capacitor.

Further, the signal modulation unit adopts a bandstop filter.

By adopting above structure, the bandstop filter is configured to attenuate the first signal and revert the control signal to reach a modulation purpose of attenuating a high frequency ripple signal to revert the controlling signal.

Further, the threshold comparison unit adopts a threshold comparator, and a threshold voltage of the threshold comparator is in a range of 0.1 V to 12 V;

Further, the amplification unit adopts an operational amplifier.

Further, the controllable switch module comprises a driving unit and a controllable switch having a controlling end and a switch end; the driving unit is configured to drive an on/off of the controllable switch. An input end of the driving unit is connected to the threshold comparison unit, an output end of the driving unit is connected to the controlling end of the controllable switch.

Further, the controllable switch comprises an MOS transistor, a drain and a source of the MOS transistor are formed to be a switch end of the controllable switch, and a gate of the MOS transistor is formed to be a controlling end of the controllable switch.

Further, the photovoltaic shutdown circuit comprises a bypass diode, a positive pole of the bypass diode is connected to the shutdown negative pole line, and a negative pole of the bypass diode is connected to the shutdown positive pole line.

A photovoltaic system, which comprises a positive bus, a negative bus, an inverter, a controlling signal generator, N photovoltaic modules, and N photovoltaic shutdowns, N is a positive integer, and the photovoltaic shutdown comprises the photovoltaic shutdown circuit described above.

In the photovoltaic system, one end of the shutdown power line is formed to be an output end of the photovoltaic shutdown circuit and another end of the shutdown power line is formed to be an input end of the photovoltaic shutdown circuit.

The output ends of the photovoltaic shutdown circuits are connected in series, and a positive pole of the output ends of the photovoltaic shutdown circuits connected in series is connected to the positive bus, and a negative pole of the output ends of the photovoltaic shutdown circuits connected in series is connected to the negative bus.

The input ends of the photovoltaic shutdown circuits are respectively and correspondently connected to each photovoltaic module one to one.

The positive bus is connected to a positive pole on a DC side of the inverter and the negative bus is connected to a negative pole on the DC side of the inverter; the controlling signal generator is connected to the negative bus to output controlling signals.

The beneficial effects are as follows:

(1) According to the present disclosure, the photovoltaic shutdown circuit with the signal processing module can correctly identify the controlling signal from the controlling signal generator which is more than 300 meters away from the photovoltaic shutdown circuit, and can effectively avoid the influence of the interference signal on the control of the photovoltaic shutdown circuit, which can guarantee the stable and reliable operation of the photovoltaic shutdown circuit.

(2) According to the present disclosure, the structure of the photovoltaic shutdown circuit is well designed.

Attachment marks: 1. shutdown power line; 101. shutdown positive pole line; 102. shutdown negative pole line; 2. signal receiving module; 201. first capacitor; 202. second capacitor; 203. first inductor; 3. signal processing module; 301. signal modulation unit; 302. threshold comparison unit;

303. amplification unit; 304. time delay unit; 4. controllable switch module; 401. driving unit; 402. controllable switch; 5. linear power module; 6. first resistor; 7. bypass diode; 8. positive bus; 9. negative bus; 10. inverter; 11. controlling signal generator; 12. photovoltaic module; 13. photovoltaic shutdown.

DETAILED DESCRIPTION OF EMBODIMENTS

Embodiments and drawings are given below to further illustrate the implementations of the present disclosure. It is to be understood that the embodiments described herein are merely illustrative of the present disclosure and are not intended to be limiting.

Figure 1:
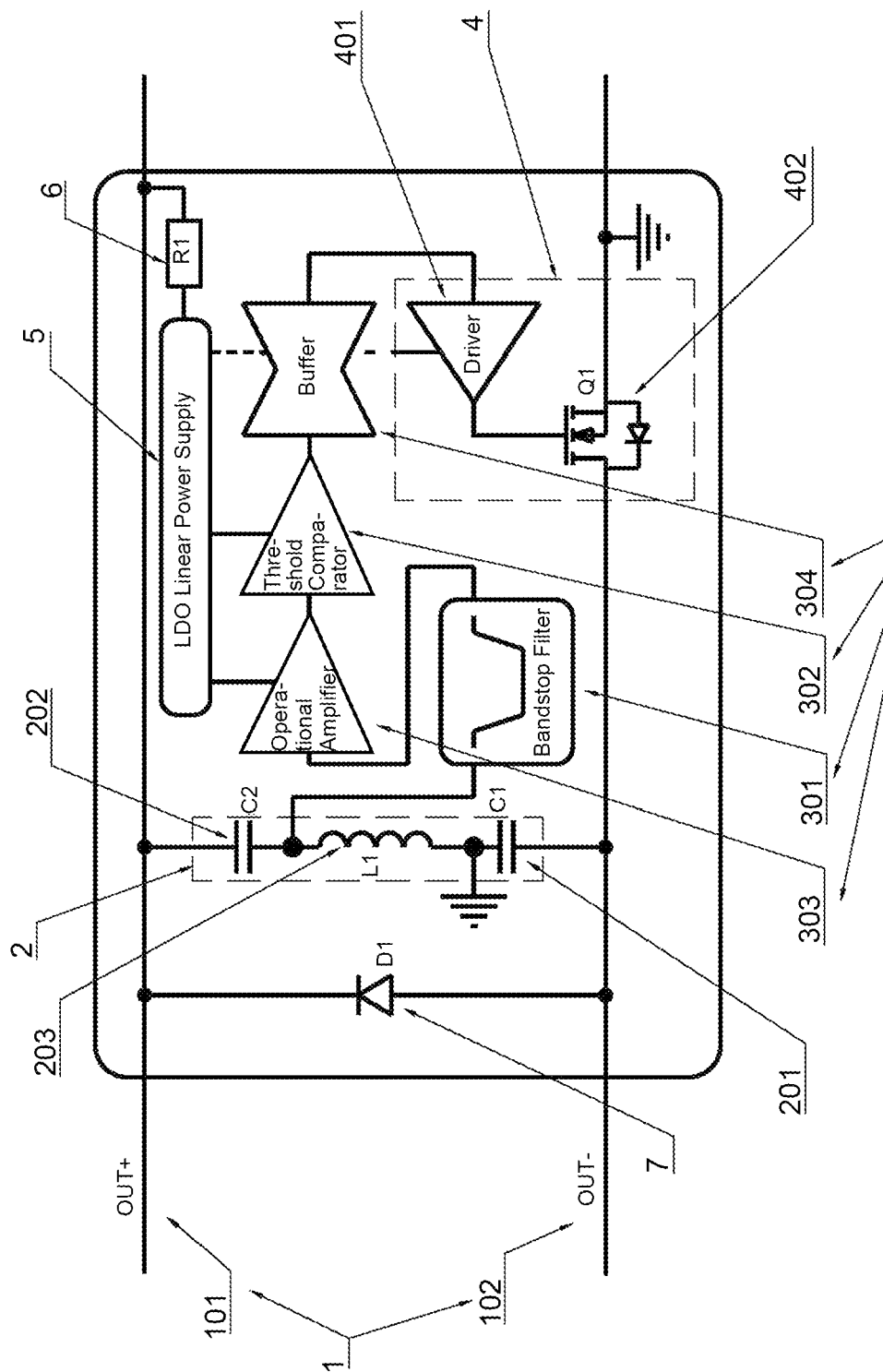
FIG. 1 is a schematic diagram of a photovoltaic shutdown circuit of the present disclosure.

As shown in FIG. 1, disclosed is a photovoltaic shutdown circuit, which comprises a shutdown power line 1, a signal receiving module 2, a signal processing module 3, and a controllable switch module 4. The signal processing module 3 comprises a signal modulation unit 301 and a threshold comparison unit 302.

A switch end of the controllable switch module 4 is connected in series to the shutdown power line 1 to control an on/off of the shutdown power line 1.

The signal receiving module 2 is connected to the shutdown power line 1 for receiving a first signal with a controlling signal in the shutter power line 1; and an output end of the signal receiving module 2 is connected to the signal processing module 3 for coupling the first signal into the signal modulation unit 301.

The signal modulation unit 301 is configured to revert the controlling signal of the first signal; and an input end of the threshold comparison unit 302 is connected to an output end of the signal modulation unit 301 to receive the reverted controlling signal and compare the reverted controlling signal with a set threshold to output a driving signal.

The controllable switch module 4 is connected to the threshold comparison unit 302 to receive the driving signal and control an on/off of the controllable switch module 4 according to the driving signal.

In use, the photovoltaic shutdown circuit is for connecting a photovoltaic module 12 and an inverter 10; a controlling signal generator 11 is provided on a bus between the photovoltaic shutdown circuit and the inverter 10, and the controlling signal generator 11 sends a controlling signal to the photovoltaic shutdown circuit through the bus.

By adopting above structure, after the controlling signal generator 11 sends a controlling signal to the photovoltaic shutdown circuit through the bus, the controlling signal is output to the shutdown power line 1, and during the transmission of the controlling signal there will be interference from ripples generated by other electronic components. The signal receiving module 2 is for receiving the first signal in the shutdown power line 1, wherein the first signal comprises the controlling signal and the interference signal. The signal modulation unit 301 receives the first signal and then reverts the controlling signal, the threshold comparison unit 302 compares the controlling signal with a set threshold according to the reverted controlling signal to control the controllable switch module 4 to realize an on/off between the photovoltaic module 12 and the inverter 10.

The above structure can make the photovoltaic shutdown circuit correctly identify the controlling signal from the controlling signal generator which is more than 300 meters away from the photovoltaic shutdown circuit, and can effectively avoid the influence of the interference signal on the control of the photovoltaic shutdown circuit, which can guarantee the stable and reliable operation of the photovoltaic shutdown circuit.

Further, the shutdown power line 1 comprises a shutdown positive pole line 101 and a shutdown negative pole line 102, and the shutdown negative pole line 102 is grounded. A switch end of the controllable switch module 4 is connected in series to the shutdown negative pole line 102 to control an on/off of the shutdown negative pole line 102; the signal processing module 3 is provided between the shutdown positive pole line 101 and the shutdown negative pole line 102.

Further, the signal processing module 3 comprises an amplification unit 303 for amplifying signals, and the output end of the signal modulation unit 301 is connected to the threshold comparison unit 302 through the amplification unit 303.

By adopting above structure, a controlling signal reverted by the signal modulation unit 301 is amplified by the amplification unit 303 and output to the threshold comparison unit 302, which enables the threshold comparison unit 302 to better identify the controlling signal after reduction.

Further, the signal processing module 3 comprises a time delay unit 304 for delaying signals, and the threshold comparison unit 302 is connected to the controllable switch module 4 through the time delay unit 304;

By adopting above structure, the time delay unit 304 can delay a driving signal output from the threshold comparison unit 302 to shield a pulse interference signal during a cycle. At the same time, the time delay unit 304 can accelerate a function of shutting off the controllable switch module 4 to prevent frequent switching of the controllable switch module 4 caused by weakening of the photovoltaic module in early morning and at night, or to prevent the occurrence of serious heating of the controllable switch module 4 caused by starting fast shutdown function under high current or instant short circuit, or to prevent the occurrence of breakthrough damage.

The time delay unit 304 provides an input signal 20 milliseconds to 500 milliseconds delay.

The aforementioned photovoltaic shutdown circuit further comprises a linear power module 5, an input end of the linear power module 5 is connected to the shutdown power line 1, and an output end of the linear power module 5 is connected to the signal processing module 3 and/or the controllable switch module 4 to supply power to the signal processing module 3 and the controllable switch module 4. The input end of the linear power module 5 is connected to the shutdown positive pole line 101.

The above structure can guarantee the stability of the operation of the photovoltaic shutdown circuit.

Further, the input end of the linear power module 5 is connected to the shutdown positive pole line 101 through a first resistor 6.

By adopting above structure, the first resistor 6 is able to absorb the controlling signal with damping; a resistance value of the first resistor 6 is in a range of from 2.2Ω to 499Ω.

Further, the signal receiving module 2 comprises a first capacitor 201, a second capacitor 202, and a first inductor 203. One end of the first capacitor 201 is connected to the shutdown negative pole line 102 and another end of the first capacitor 201 is connected to one end of the first inductor 203, and another end of the first inductor 203 is connected to one end of the second capacitor 202, and another end of the second capacitor 202 is connected to the shutdown positive pole line 101, and the end of the first capacitor 201 connected to one end of the first inductor 203 is grounded, and the end of the second capacitor 202 connected to one end of the first inductor 203 is formed to be the output end of the signal receiving module 2.

By adopting above structure, the first signal in the shutdown power line 1 is coupled into the signal modulation unit 301 after a coupling of the first capacitor 201 and a resonant frequency selection by the first inductor 203 and second capacitor 202.

Further, the signal modulation unit 301 adopts a bandstop filter.

By adopting above structure, the bandstop filter attenuates the first signal and then reverts the control signal to reach the modulation purpose of attenuating a high frequency ripple signal to revert the control signal.

Further, the threshold comparison unit 302 adopts a threshold comparator, and a threshold voltage of the threshold comparator is in a range of 0.1 V to 12 V.

Further, the amplification unit 303 adopts an operational amplifier.

Further, the controllable switch module 4 comprises a controllable switch 402 that has a controlling end and a switch end, and a driving unit 401 that drives an on/off of the controllable switch 402. An input end of the driving unit 401 is connected to the threshold comparison unit 302, an output end of the driving unit 401 is connected to the controlling end of the controllable switch 402.

Further, the controllable switch 402 comprises a MOS transistor, a drain and a source of the MOS transistor are formed to be a switch end of the controllable switch 402, and a gate of the MOS transistor is formed to be a controlling end of the controllable switch 402.

The photovoltaic shutdown circuit further comprises a bypass diode 7, a positive pole of the bypass diode 7 is connected to the shutdown negative pole line 102, and a negative pole of the bypass diode 7 is connected to the shutdown positive pole line 101.

Figure 2:
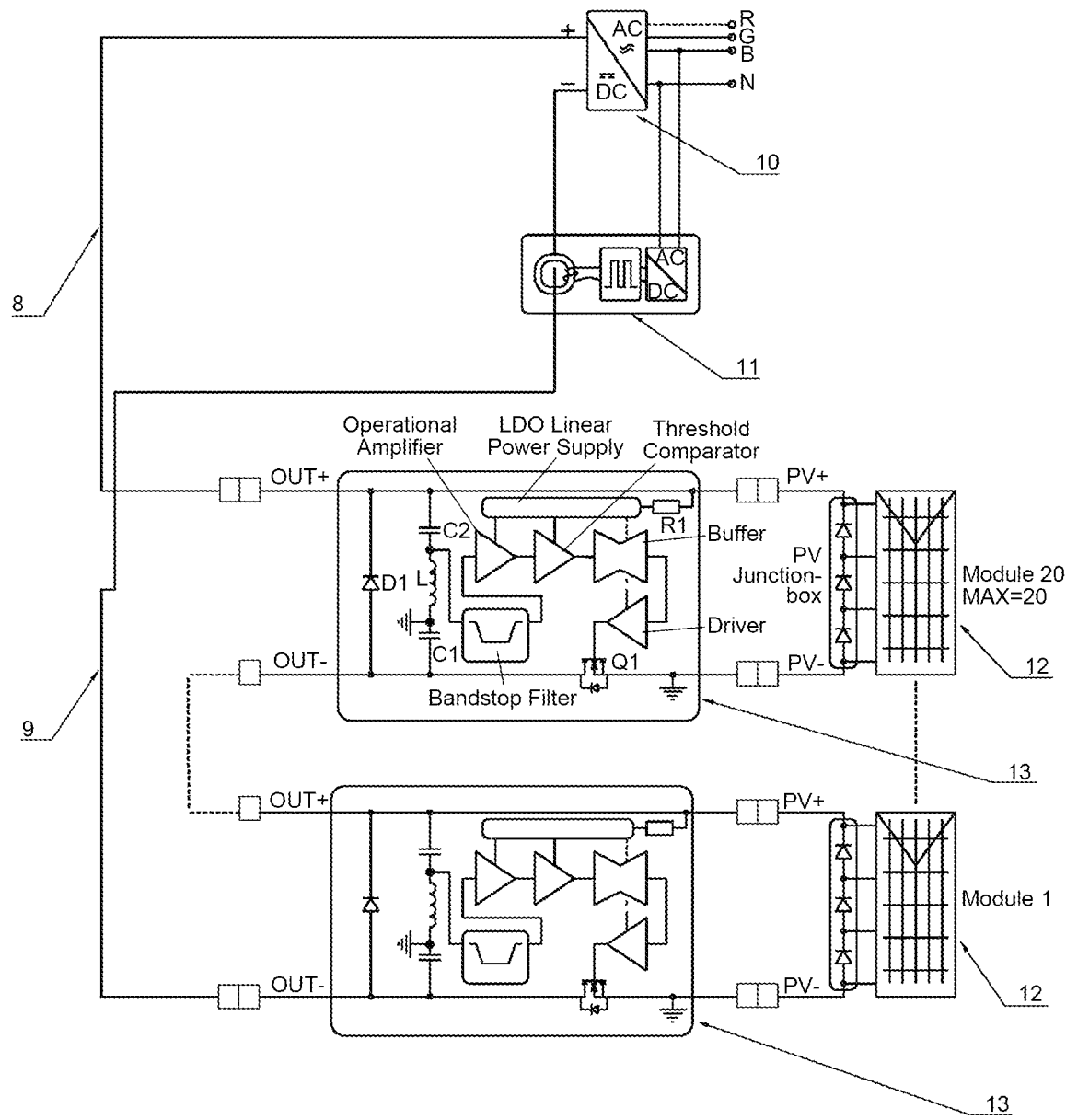
FIG. 2 is a schematic diagram of a photovoltaic system of the present disclosure.

As shown in FIGS. 1 and 2, a photovoltaic system, comprising a positive bus 8, a negative bus 9, an inverter 10, a controlling signal generator 11, N photovoltaic modules 12, and N photovoltaic shutdowns 13 is disclosed. N is a positive integer, and the photovoltaic shutdown 13 comprises the photovoltaic shutdown circuit described above.

One end of the shutdown power line 1 is formed to be an output end of the photovoltaic shutdown circuit and another end of the shutdown power line 1 is formed to be an input end of the photovoltaic shutdown circuit.

The output ends of the photovoltaic shutdown circuits are connected in series, and a positive pole of the output ends of the photovoltaic shutdown circuits connected in series is connected to the positive bus 8, and a negative pole of the output ends of the photovoltaic shutdown circuits connected in series is connected to the negative bus 9.

The input ends of the photovoltaic shutdown circuit are respectively and correspondingly connected to each photovoltaic module 12 one to one.

The positive bus 8 is connected to a positive pole on a DC side of the inverter 10, and the negative bus 9 is connected to the negative pole on the DC side of the inverter 10. The controlling signal generator 11 is connected to the negative bus 8 to output controlling signals.

It is to be understood that the present disclosure is not limited to the embodiments described above. Modifications and variations may be resorted to in light of the above teachings by those skilled in the art, all these modifications and variations should be considered as falling within the scope of the appended claims.

What is claimed is:

1. A photovoltaic shutdown circuit, comprising a shutdown power line (1), a signal receiving module (2), a signal processing module (3), and a controllable switch module (4); wherein the signal processing module (3) comprises a signal modulation unit (301) and a threshold comparison unit (302);
   a switch end of the controllable switch module (4) is connected in series to the shutdown power line (1) to control an on/off of the shutdown power line (1);
   the signal receiving module (2) is connected to the shutdown power line (1) to receive a first signal with a controlling signal from the shutter power line (1); and
   an output end of the signal receiving module (2) is connected to the signal processing module (3) to couple the first signal into the signal modulation unit (301);
   the signal modulation unit (301) is configured to revert the controlling signal of the first signal; and an input end of the threshold comparison unit (302) is connected to an output end of the signal modulation unit (301) to receive the reverted controlling signal and compare the reverted controlling signal with a set threshold to output a driving signal; and
   the controllable switch module (4) is connected to the threshold comparison unit (302) to receive the driving signal and control an on/off of the controllable switch module (4) according to the driving signal.

2. The photovoltaic shutdown circuit according to claim 1, wherein the signal processing module (3) comprises an amplification unit (303) configured to amplify signals, and the output end of the signal modulation unit (301) is connected to the threshold comparison unit (302) through the amplification unit (303).

3. The photovoltaic shutdown circuit according to claim 1, wherein the signal processing module (3) comprises a time delay unit (304) configured to delay signals, and the threshold comparison unit (302) is connected to the controllable switch module (4) through the time delay unit (304);
   the time delay unit (304) provides an input signal 20 milliseconds to 500 milliseconds delay.

4. The photovoltaic shutdown circuit according to claim 1, wherein comprising a linear power module (5), an input end of the linear power module (5) is connected to the shutdown power line (1), and an output end of the linear power module (5) is connected to the signal processing module (3) and/or the controllable switch module (4) to supply power to the signal processing module (3) and/or the controllable switch module (4);
   the input end of the linear power module (5) is connected to the shutdown power line (1) through a first resistor (6); and
   a resistance value of the first resistor (6) is in a range of 2.2Ω to 499Ω.

5. The photovoltaic shutdown circuit according to claim 1, wherein the shutdown power line (1) comprises a shutdown positive pole line (101) and a shutdown negative pole line (102);
   the signal receiving module (2) comprises a first capacitor (201), a second capacitor (202), and a first inductor (203); one end of the first capacitor (201) is connected to the shutdown negative pole line (102) and another end of the first capacitor (201) is connected to one end of the first inductor (203), another end of the first inductor (203) is connected to one end of the second capacitor (202), another end of the second capacitor (202) is connected to the shutdown positive pole line (101); the end of the first capacitor (201) connected to the first inductor (203) is grounded, and the end of the second capacitor (202) connected to the first inductor (203) is formed to be the output end of the signal receiving module (2).

6. The photovoltaic shutdown circuit according to claim 2, wherein the signal modulation unit (301) adopts a band-stop filter;
the threshold comparison unit (302) adopts a threshold comparator, and a threshold voltage of the threshold comparator is in a range of 0.1 V to 12 V; and
the amplification unit (303) adopts an operational amplifier.

7. The photovoltaic shutdown circuit according to claim 1, wherein the controllable switch module (4) comprises a driving unit (401) and a controllable switch (402); the driving unit (401) drives an on/off of the controllable switch (402), and the controllable switch (402) has a controlling end and a switch end; an input end of the driving unit (401) is connected to the threshold comparison unit (302), and an output end of the driving unit (401) is connected to the controlling end of the controllable switch (402).

8. The photovoltaic shutdown circuit according to claim 7, wherein the controllable switch (402) comprises a MOS transistor, a drain and a source of the MOS transistor are formed to be the switch end of the controllable switch (402), and a gate of the MOS transistor is formed to be the controlling end of the controllable switch (402).

9. The photovoltaic shutdown circuit according to claim 1, wherein comprising a bypass diode (7),
the shutdown power line (1) comprises a shutdown positive pole line (101) and a shutdown negative pole line (102); and
a positive pole of the bypass diode (7) is connected to the shutdown negative pole line (102), and a negative pole of the bypass diode (7) is connected to the shutdown positive pole line (101).

10. A photovoltaic system, comprising a positive bus (8), a negative bus (9), an inverter (10), a controlling signal generator (11), N photovoltaic modules (12), and N photovoltaic shutdowns (13), wherein N is a positive integer, and the photovoltaic shutdown (13) comprises the photovoltaic shutdown circuit according to claim 1;
one end of the shutdown power line (1) is formed to be an output end of the photovoltaic shutdown circuit, another end of the shutdown power line (1) is formed to be an input end of the photovoltaic shutdown circuit;
the output ends of the photovoltaic shutdown circuits are connected in series, and a positive pole of the output ends of the photovoltaic shutdown circuits connected in series is connected to the positive bus (8), and a negative pole of the output ends of the photovoltaic shutdown circuits connected in series is connected to the negative bus (9);
the input ends of the photovoltaic shutdown circuits are respectively and correspondently connected to each photovoltaic module (12) one by one; and
the positive bus (8) is connected to a positive pole on a DC side of the inverter (10) and the negative bus (9) is connected to a negative pole on the DC side of the inverter (10); the controlling signal generator (11) is connected to the negative bus (9) to output controlling signals.

* * * * *